US006798942B2

(12) United States Patent
Freeman et al.

(10) Patent No.: US 6,798,942 B2
(45) Date of Patent: Sep. 28, 2004

(54) ZERO STATIC POWER OPTICAL SWITCH

(75) Inventors: William R. Freeman, Castro Valley, CA (US); Dallas Meyer, Danville, CA (US)

(73) Assignee: Finisar Corporation, Sunnyvale, CA (US)

( * ) Notice: Subject to any disclaimer, the term of this patent is extended or adjusted under 35 U.S.C. 154(b) by 96 days.

(21) Appl. No.: 10/117,769

(22) Filed: Apr. 5, 2002

(65) Prior Publication Data

US 2003/0190116 A1 Oct. 9, 2003

(51) Int. Cl.⁷ .................................................. G02B 6/35
(52) U.S. Cl. .......................................... 385/18; 385/16
(58) Field of Search ..................................... 385/15–18

(56) References Cited

U.S. PATENT DOCUMENTS

| | | | |
|---|---|---|---|
| 5,031,994 A | 7/1991 | Emmons | 350/96.2 |
| 5,035,482 A | 7/1991 | Berge et al. | 350/96.2 |
| 5,042,889 A | 8/1991 | Benzoni | 385/16 |
| 6,169,826 B1 | 1/2001 | Nishiyama et al. | 385/22 |
| 6,256,430 B1 * | 7/2001 | Jin et al. | 385/18 |
| 6,386,716 B2 | 5/2002 | Hagelun et al. | 359/871 |
| 6,496,612 B1 * | 12/2002 | Ruan et al. | 385/18 |
| 6,542,653 B2 * | 4/2003 | Wu et al. | 385/16 |
| 6,597,828 B2 * | 7/2003 | Lee et al. | 385/18 |
| 2002/0018615 A1 * | 2/2002 | Laor et al. | 385/18 |

OTHER PUBLICATIONS

M. Fernandez and E. Kruglick MEMS Brings New Solutions to Phototonic Switching 2000.

* cited by examiner

Primary Examiner—John D. Lee
Assistant Examiner—Tina M Lin
(74) Attorney, Agent, or Firm—Workman Nydegger

(57) ABSTRACT

A micro electromechanical (MEMS) electromagnetic optical switch capable of redirecting light signals to a plurality of different output structures. The optical switch utilizes a movable mirror to redirect light signals. The mirror is magnetically moved into a predetermined fixed position by a magnetic member such that the mirror is positioned to redirect a light signal into one of a plurality of output structures. An electrical assembly induces a temporary magnetic field across the magnetic member to initiate the movement of the mirror.

32 Claims, 5 Drawing Sheets

ZERO STATIC POWER OPTICAL SWITCH

BACKGROUND OF THE INVENTION

1. The Field of the Invention

This invention relates generally to the field of optical switching devices for use in optical networks. In particular, embodiments of the present invention relate to a micro electromechanical magnetically controlled optical switch that is particularly useful for switching optical signals between a plurality of optical fibers.

2. The Relevant Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on copper conductor.

Many conventional electrical networks are being upgraded to optical networks to take advantage of the increased speed and efficiency. One of the many required components of an optical network is an optical switching device. An optical switching device has the capability of switching an individual light signal between at least two different locations. Usually the optical signal is first demultiplexed or dispersed and the individual channels are switched and routed to specific locations. It is preferable to optically switch the optical signals rather than converting them to electrical signals and then switching them with conventional electrical switching techniques.

The field of optical switching has progressed rapidly in the last decade. For large bandwidth applications, it is important that the optical switches be extremely small to allow many channels to be switched in a relatively small amount of space. The newest types optical switches fit into the general category of micro-electromechanical systems (MEMS). The size of these devices is typically on the order of microns. Three narrower categories of MEMS optical switches have emerged as the most promising design configurations: piezoelectric, electrostatic and electromagnetic. All of these switches utilize micro-mirrors to switch or reflect an optical channel or signal from one location to another depending on the relative angle of the micro-mirror. Because of the small size of optical MEMS switches, it is important to design a switch that is durable, consumes little power and can generate a sufficient amount of power to rotate the mirror. Durability is important because, over the lifetime of a switch, it is quite common for dust and other debris particles to pass within the switch. Power consumption in optical switches must be minimized because optical switches are usually in operation at all times and therefore any unnecessary power consumption is a significant waste of resources. It is also important for the optical switch design to be capable of generating sufficient forces to rotate the mirror within a large range of angles.

Piezoelectric switches utilize piezoelectric materials to change shape proportionally to how much electrical voltage is applied to them. The mirror is then attached to the piezoelectric material, which can be manipulated by applying varying degrees of electrical voltage. Unfortunately, piezoelectric materials used in optical switches tend to require relatively high (100V range) voltages to produce relatively small motions, which limit the angular range the mirror is capable of achieving. Piezoelectric materials also tend to be somewhat fragile and susceptible to long term drift.

Electrostatic switches are currently the most popular form of MEMS optical switches. These switches utilize the small electrostatic force produced by a diamagnetic material when an electrical field is induced upon it. Unfortunately, electrostatic optical switches require high voltages (high by 3V CMOS standards but generally less than required to actuate piezoelectric switches) and produce relatively small forces. This means that it is difficult to design an individual electrostatic optical switch that is capable of switching between a large number of fibers. For this reason, electrostatic optical switches are typically used in large arrays. In addition, these switches tend to be fragile to foreign particulates and sensitive to moisture.

Electromagnetic switches are the last category of typical MEMS optical switches. This form of optical switch is rarely used despite the numerous advantages they possess over other types of MEMS switches. Electromagnetic optical switches tend to utilize ferromagnetic materials to rotate and manipulate the angle of the mirror. Ferromagnetic materials are easily magnetized and are capable of producing large forces. A hard ferromagnetic material has a wide hysteresis curve (B v H or Magnetic curve) and therefore has the ability to generate remnant magnetization even after an external magnetic field is turned off. For this reason, hard ferromagnetic materials are commonly used to make permanent magnets. A soft ferromagnetic material has a relatively narrow hysteresis curve and consequently is incapable of producing a magnetic force without an external magnetic field being applied across it. Electromagnetic optical switches are capable of generating large forces while consuming little power. In addition, electromagnetic optical switches are durable to particles that may otherwise interfere with the performance of other switches.

There is a need in the industry for an efficient electromagnetic MEMS optical switch that consumes low power yet is still durable in relation to other forms of optical switches.

BRIEF SUMMARY OF THE INVENTION

These and other problems in the prior art are addressed by embodiments of the present invention, which relates to a MEMS electromagnetic optical switch that generates large magnetic forces and consumes little energy.

In a preferred embodiment, the electromagnetic optical switch generally comprises a reflection member rotatably coupled to a base. The optical switching function of the device is performed by rotating the reflection member to a specified angle so as to redirect an optical signal to one of a plurality of output locations. The reflection member further comprises a substrate with a mirror coupled to one surface of the substrate and at least one substrate magnetic member connected to the opposite surface of the substrate. The mirror naturally reflects an incident optical signal in a direction mathematically related to the angle of the mirror itself with respect to normal. The substrate magnetic members are permanent ferromagnetic magnets.

In a preferred embodiment, the electromagnetic optical switch further comprises a plurality of magnetic members and a plurality of electrical assemblies. The magnetic members are preferably formed from a hard ferromagnetic material with a high saturation point and a low coercivity. The magnetic members are disposed in substantial alignment with the substrate magnetic members of the reflection member. The electrical assemblies are further comprised of a conductor, a switch and a source. The conductor is configured to apply a magnetic field across one of the plurality of magnetic members when a current is induced through the conductor. The conductor is electrically connected to the source. The switch is disposed on the electrical connection between the conductor and the source so as to control the current flow from the source to the conductor.

In one preferred embodiment, the electromagnetic optical switch is operated by magnetically rotating the reflection member so as to deflect incident optical signals to a desired output location. This is accomplished by first switching the switch to electrically connect the source to the conductor of the electrical circuit. This causes a magnetic field to be generated across the corresponding magnetic member. The corresponding magnetic member then creates a magnetic force upon the corresponding substrate magnetic member. This force is either an attraction or a repulsion force depending on the desired angle of the reflection member. Since there are multiple groupings of corresponding magnetic members, electrical circuits and substrate magnetic members, the attraction or repulsion force generated by each grouping depends on the desired position of the reflection member.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to an optical switch that utilizes ferromagnetic materials and magnetic fields for rotating and manipulating a mirror within a particular range of motion. As will be described in further detail below, the optical switch is capable of redirecting optical signals from one optical fiber to one of a plurality of other optical fibers. Also, while embodiments of the present invention are described in the context of fiber optic switching mechanisms, it will be appreciated that the teachings of the present invention are applicable to other applications as well.

Figure 1:
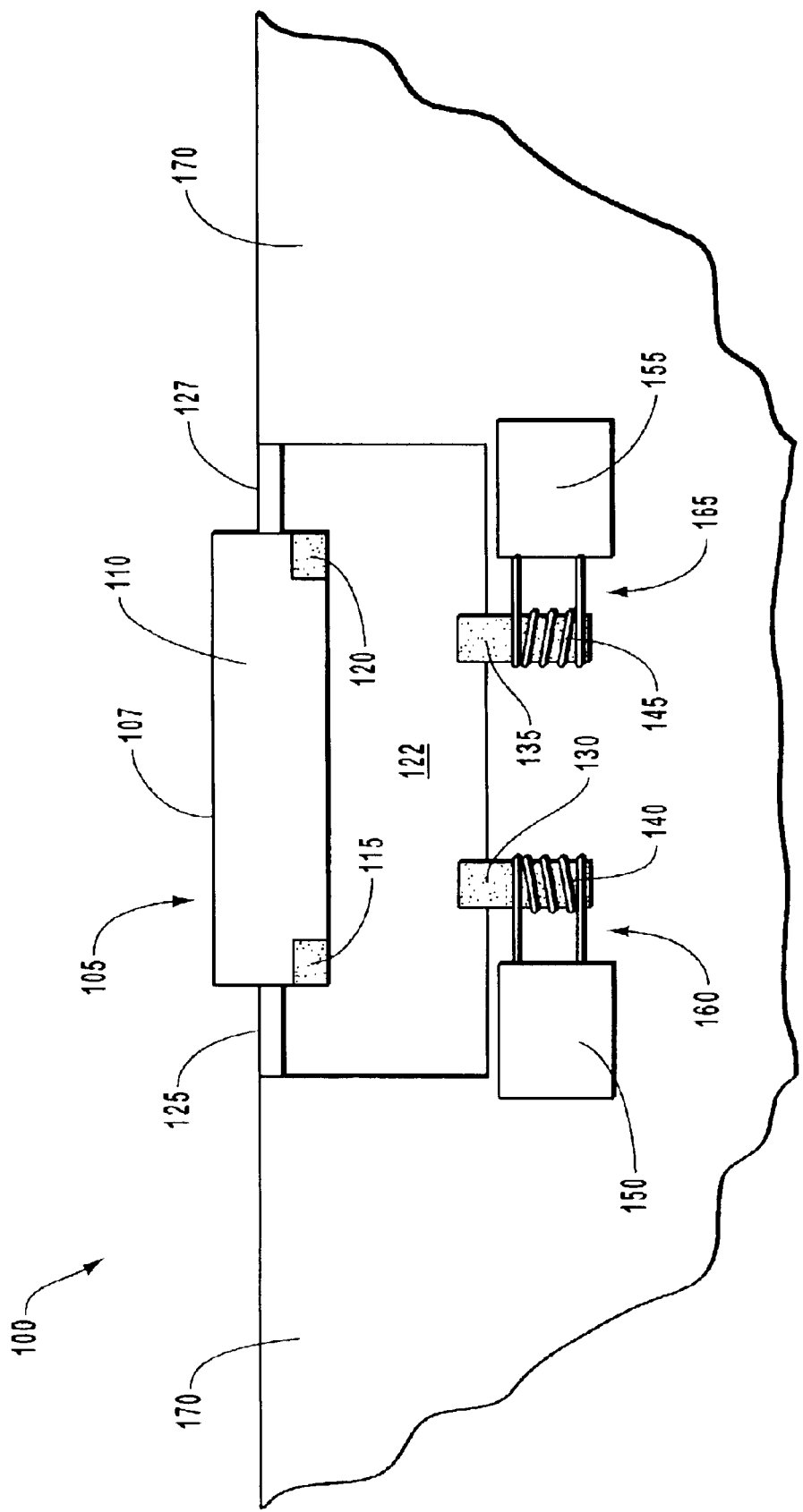
FIG. 1 illustrates a cross-sectional profile view of one embodiment of an electromagnetic optical switch containing lower stops.

Referring first to FIG. 1, one embodiment of an electromagnetic optical switch, designated generally at 100, is shown. In this embodiment, the optical switch 100 includes a base 170, a reflection member 105, four magnetic members 115, 120, 130, 135, and two electrical assemblies 160, 165. The reflection member 105 further comprises a mirror 107 which is coupled to the top of a substrate 110, a first substrate magnetic member 115, and a second substrate magnetic member 120. The substrate magnetic members 115, 120 are coupled to the bottom of the substrate 110. The substrate magnetic members 115, 120 are formed from a hard ferromagnetic material with a high saturation point and a low coercivity, wherein the magnetic members 115, 120 have previously been magnetized so as to form permanent magnets. A pair of flexures 125, 127 elastically couple the reflection member 105 to the base 170. Flexures can be formed from any material that is capable of providing rigid yet flexible response. For example, silicon nitride is a common flexure material that can be used with the invention. Flexures 125, 127 represent one example of means for coupling the reflection member to the base in a manner that allows rotational motion of the reflection member and also represents an example of means for supporting the reflection member in any of a plurality of positions.

As is further shown in FIG. 1, the base 170 forms a cavity 122 with a particular width and depth configured to house the reflection member 105 in the manner shown. A first and a second base magnetic member 130, 135 are located at the bottom of the cavity 122 such that each is approximately horizontally aligned with one of the substrate magnetic members 115, 120 located on the bottom of the substrate 110. The base magnetic members 130, 135 rise above the bottom of the cavity 122 so as to form stops for the reflective member 105. The base magnetic members 130, 135 are formed from of a hard ferromagnetic material with a high saturation point and a low coercivity.

A first and a second electrical assembly 160, 165 are positioned to individually apply a magnetic field across the first and second base magnetic members 130, 135, respectively. The electrical assemblies 160, 165 include an electrical conductor 140, 145 and an electrical circuit 150, 155. The electrical conductors 140, 145 are configured and disposed to generate a magnetic field upon the corresponding base magnetic member 130, 135 when an electrical current is induced across the electrical conductors 140, 145. The electrical conductors 140, 145 are electrically coupled to the electrical circuits 150, 155. The electrical circuits 150, 155 further include an electrical source and a switch. In addition, the electrical circuits 150, 155 may be connected to external computer circuitry or contain logic circuits to efficiently control the timing and amount of electrical current placed across the electrical conductors 140, 145.

As is further shown in FIG. 1, the reflective member 105 can be magnetically rotated by the relative magnetic attraction and repulsion forces of base magnetic members 130, 135 and substrate magnetic members 115, 120. The electrical assemblies 160, 165 generate a directional magnetic field across the corresponding base magnetic members 130, 135. The magnetic field then causes the base magnetic member 130, 135 to generate a magnetic force. Thus, electrical assemblies 160 and 165, as well as the other electrical assemblies disclosed herein, represent examples of means for electromagnetically moving the reflection member into a fixed position by temporarily inducing a current that initiates the movement of the reflection member.

The direction of each magnetic field is based upon the desired position of the reflection member 105. For example, if it is desired to rotate the reflection member 105 in a clockwise motion, the magnetic field generated by the second electrical circuit 165 is selected to cause the second base magnetic member 135 to exert a magnetic attraction force upon the second substrate magnetic member 120. Likewise, the first electrical circuit 160 generates a magnetic field across the first base magnetic member 130 such that a repulsion force is exerted upon the first substrate magnetic member 115. When these magnetic forces are generated between the magnetic members 115 and 130 and between the magnetic members 120 and 135, the reflective member 105 is forced to rotate in a clockwise motion. A similar configuration can be used to rotate the mirror in a counter-clockwise motion.

The mirror can be flattened and aligned horizontally by configuring both electrical assemblies 160, 165 to generate a magnetic field in the same direction. This causes both base magnetic members 130, 135 to exhibit the same direction of force upon the corresponding substrate magnetic members 115, 120. Thereby, the mirror is horizontally aligned. It should be noted that since the base magnetic members 130, 135 are formed from a hard ferromagnetic substance, the electrical circuits 160, 165 only need to pulse a magnetic field across the base magnetic members to induce a magnetic force to be exerted by the base magnetic members 130, 135. Likewise, when it is necessary to change the orientation of the reflection member 105, the electrical circuits only need to pulse a new magnetic field across the base magnetic members to alter the magnetic force generated by the base magnetic members 130, 135. The pulsed magnetic fields generated by the electrical assemblies 160, 165 cause the base magnetic members 130, 135 to change their position on a hysteresis curve and, when the magnetic field is removed, the base magnetic members 130, 135 relax to a new position on the hysteresis curve. Considerable power consumption is saved by utilizing the remnant magnetization properties of the hard ferromagnetic base magnetic members 130, 135 in this way.

Figure 2:
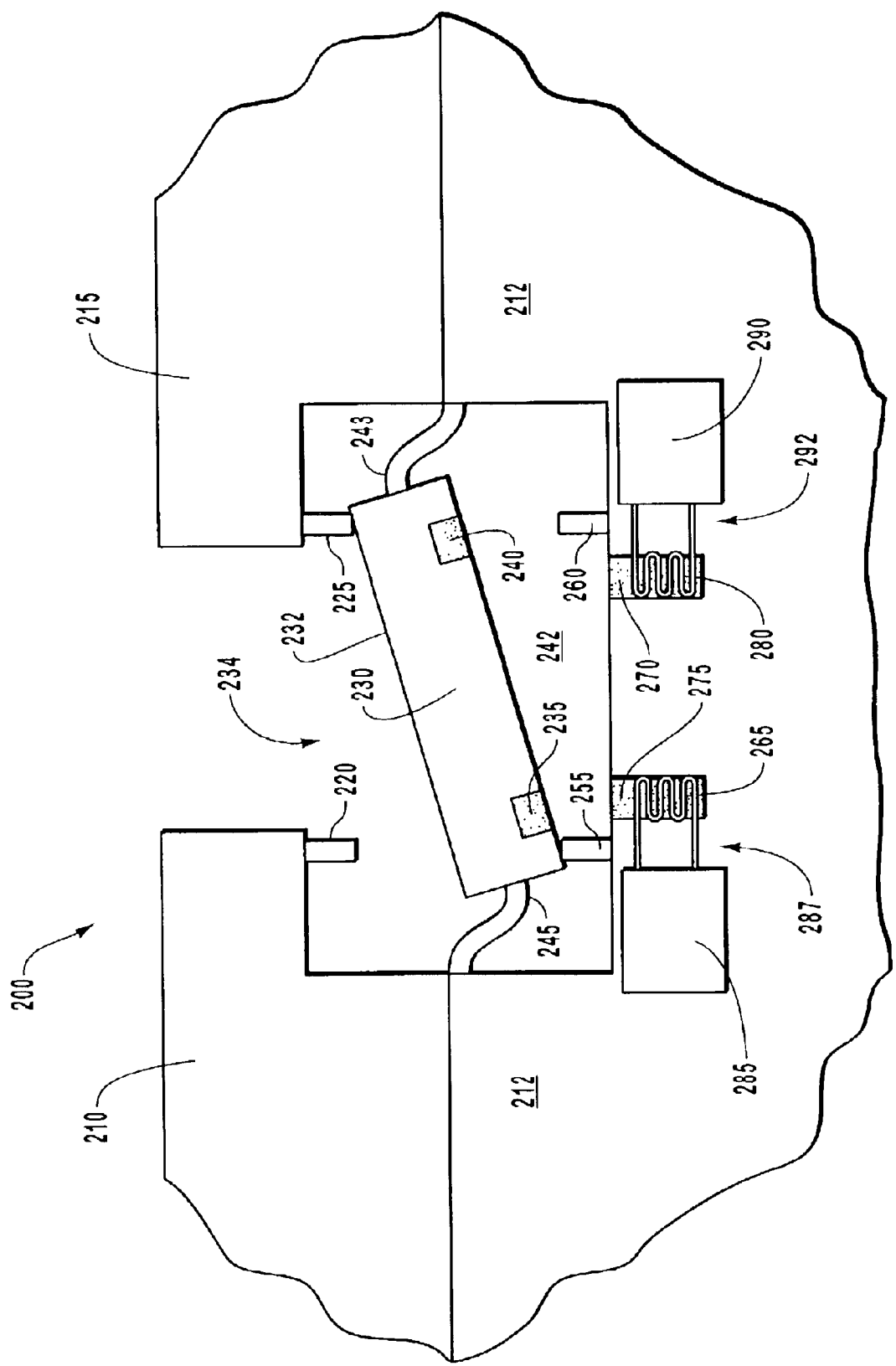
FIG. 2 illustrates a cross-sectional profile view of an alternative embodiment of an electromagnetic optical switch containing lower and upper stops.

Reference is next made to FIG. 2, wherein an alternative embodiment of an electromagnetic optical switch, designated generally at 200, is shown. Many of the components that make up the optical switch 200 are described in more detail with reference to FIG. 1. This embodiment of the electromagnetic optical switch 200 utilizes four nonmagnetic stops 220, 225, 255, 260 to brace and prevent over-rotation of the reflection member 234. This additional bracing of the reflection member 234 helps to prevent misalignment when an optical signal is being redirected to another fiber. The non-magnetic stops 220, 225, 255, 260 are formed from a non-magnetic material that will not damage the reflection member upon contact.

Similar to FIG. 1, the reflection member 234 includes mirror 232, a substrate 230 and two substrate magnetic members 235, 240. The substrate magnetic members 235, 240 are formed from a pre-magnetized hard ferromagnetic substance. Also similar to FIG. 1, a pair of flexures 243, 245 is used to elastically couple the reflection member 234 to a base 212. The base 212 contains a cavity 242 with a particular length and width to house the reflection member 234 as shown. Unlike FIG. 1, this embodiment of the electromagnetic optical switch 200 has a first assembly 210 and a second assembly 215. The assemblies 210, 215 are shaped and coupled to the base 212 in a manner to increase the height of the cavity 242. The assembly stops 220, 225 are secured to the lower portion of the corresponding assemblies 210, 215 such that when the reflection member 234 is rotated in either a clockwise or counter-clockwise motion, the assembly stops 220, 225 prevent further rotation of the reflection member 234 in that direction. FIG. 2 illustrates the second assembly stop 225 preventing the reflection member 234 from rotating in a counter-clockwise motion.

As is also shown in FIG. 2, the electrical assemblies 287, 292 and base magnetic members 275, 270 are located under the bottom of the cavity 242. Similar to FIG. 1, the electrical assemblies 287, 292 include electrical conductors 265, 280 and electrical circuits 285, 290. Unlike FIG. 1, the electrical conductors 265, 280 in this embodiment are shown to be stacked rather than wrapped around the base magnetic members 275, 270. This configuration also enables the electrical assemblies 287, 292 to create a magnetic field across the base magnetic members 275, 270. The base magnetic members 275, 270 are formed from a hard ferromagnetic material with a high saturation point and a low coercivity such that they exhibit remnant magnetization properties even after a magnetic field is turned off. Unlike FIG. 1, this embodiment contains two base stops 255, 260, which are secured to the upper potion of the base 212 within cavity 242. The base stops 255, 260 act in the same manner as the assembly stops 220, 225 such that they prevent the further rotation of the reflection member 234 in either a clockwise or counter-clockwise motion. FIG. 2 shows the first base stop 255 preventing the reflection member 234 from further rotating in a counter-clockwise motion. The operation of this embodiment of the electromagnetic switch 200 is similar to the embodiment shown in FIG. 1 except for the addition of the assembly stops 220, 225.

Figure 3:
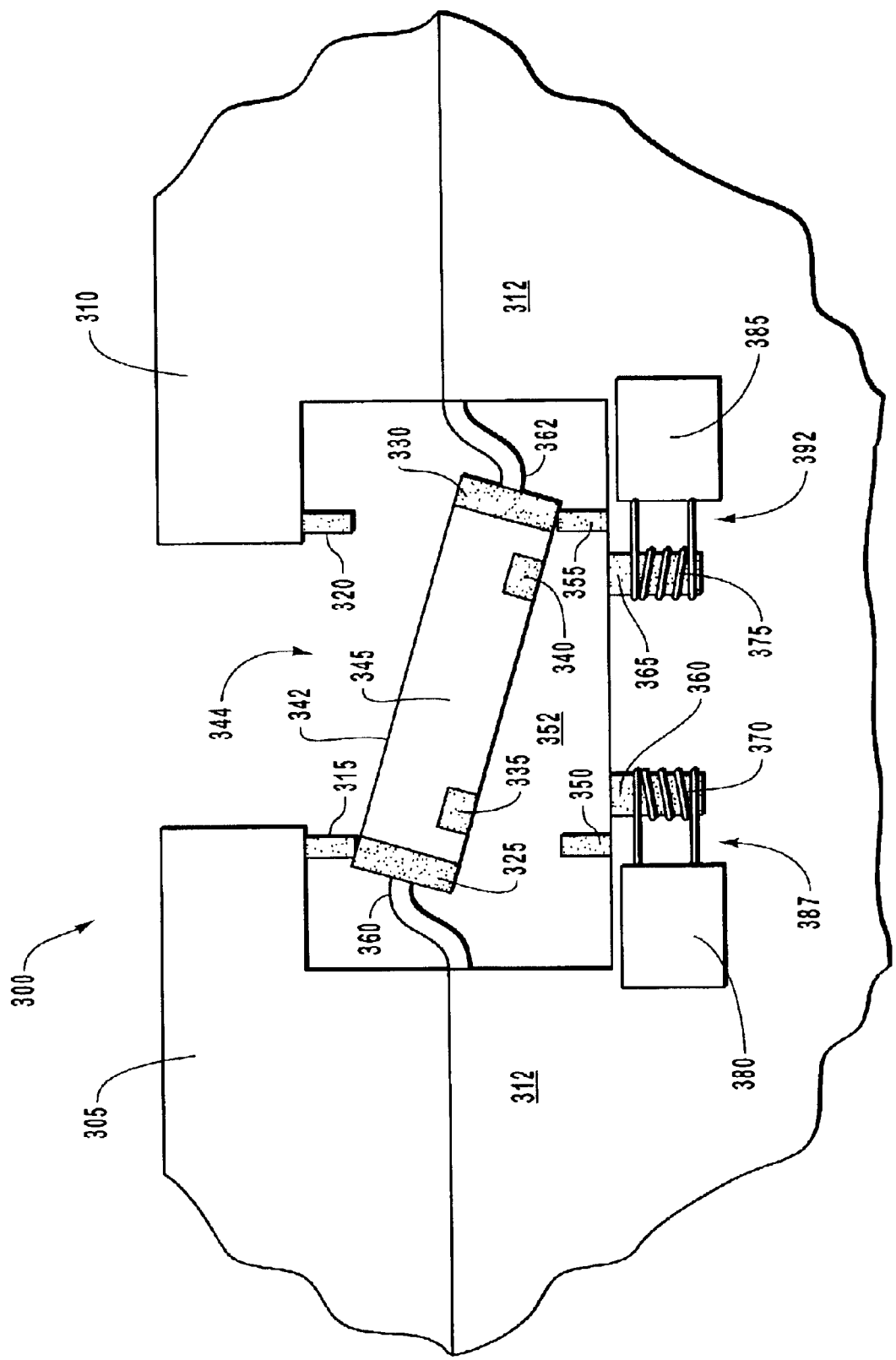
FIG. 3 illustrates a cross-sectional profile view of yet another alternative embodiment of an electromagnetic optical switch containing magnetic bit stops.

Reference is next made to FIG. 3, wherein yet another embodiment of an electromagnetic optical switch, designated generally at 300, is shown. Many of the components that make up the electromagnetic optical switch 300 are described in mare detail with reference to FIG. 1. The embodiment shown in FIG. 3 utilizes four magnetic stops 315, 320, 350, 355 that prevent over-rotation of the reflection member 344 and secure the reflection member 344 in a particular position. Unlike FIGS. 1 and 2, the base magnetic members 360, 365 in this embodiment are formed from a soft ferromagnetic material that does not exhibit remnant magnetization properties. Similar to FIGS. 1 and 2, the reflection member 344 includes a mirror 342, a substrate 345 and two substrate magnetic members 335, 340. But unlike FIGS. 1 and 2, the reflection member 344 also contains two side magnetic members 325, 330 formed from a pre-magnetized hard ferromagnetic material. The base 312 contains a cavity 352 with a particular length and width to house the reflection member 344 as shown.

Similar to FIG. 2, the electromagnetic optical switch 300 further comprises a first assembly 305 and a second assembly 310 that are shaped and configured to fit on top of the base 312 and to increase the height of the cavity 352. Also similar to FIG. 1, a pair of flexures 361 and 362 are used to elastically couple the reflection member 344 to the base 312. The assembly stops 315, 320 are secured to the lower portion of the assemblies 305, 310, such that when the reflection member 344 is rotated in either a clockwise or counter-clockwise motion, the assembly stops 315, 320 prevent further rotation of the reflection member 344 in that direction. In addition to preventing further rotation, the assembly stops 315, 320 magnetically secure the reflection member 344 at a particular location. This is accomplished by the magnetic attraction force between the side magnetic members 325, 330 and the assembly stops 315, 320. FIG. 3 illustrates the first assembly stop 315 preventing the reflection member 344 from rotating in a counter-clockwise motion and magnetically securing the reflection member 344 in that position.

As is also shown in FIG. 3, the electrical assemblies 387, 392 are located under the bottom of the cavity 342. Similar to FIGS. 1 and 2, the electrical assemblies 387, 392 include electrical conductors 370, 375 and electrical circuits 380, 385. The base magnetic members 360, 365 are formed from a soft ferromagnetic material that does not exhibit remnant magnetization properties after a magnetic field is turned off. Similar to FIG. 2, this embodiment also contains two base stops 350, 355, which are secured to the lower potion of the base cavity 352. The base stops 350, 355 act in the same manner as the assembly stops 315, 320, such that they prevent the further rotation of the reflection member 344 in either a clockwise or counter-clockwise motion and also magnetically secure the reflection member 344 in a particular position. FIG. 3 shows the second base stop 355 preventing the reflection member 344 from further rotating in a clockwise motion. The second base stop 355 is also magnetically bonding with the second side magnetic member 330 of the reflection member 344 so as to secure the reflection member in a particular position.

The operation of this embodiment of the electromagnetic switch 300 is similar to the embodiment shown in FIG. 2 except the stops 315, 320, 350, 355 are magnetic and the base magnetic members 360, 365 are formed from a soft ferromagnetic material. When a magnetic field is induced across the base magnetic members 360, 365 in this embodiment, they generate an attraction or repulsion magnetic force in the same manner as described with reference to FIG. 1. But unlike FIG. 1, when the magnetic fields generated by the electrical assemblies 387, 392 are turned off, the base magnetic members 360, 365 no longer generate a magnetic force. The reflection member 344 is held in place by the magnetic attraction force between the stops 315, 320, 350, 355 and the side magnetic members 325, 330. When a different magnetic field is induced across the base magnetic members 360, 365, the base magnetic members 360, 365 generate a magnetic attraction or repulsion force large enough to overcome the magnetic attraction force between the stops 315, 320, 350, 355 and the side magnetic members 325, 330.

Figure 4:
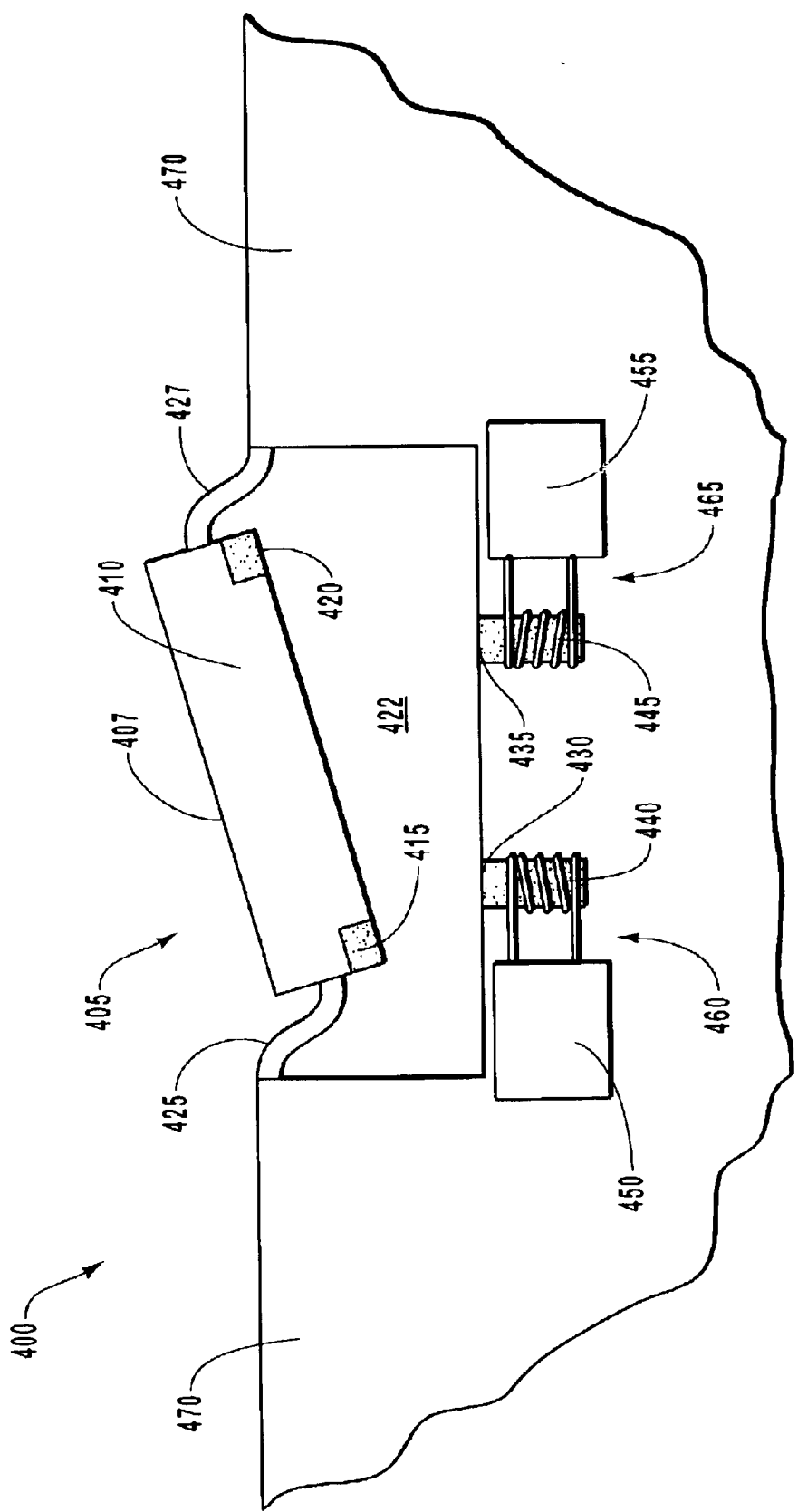
FIG. 4 illustrates a cross-section profile view of still another alternative embodiment of an electromagnetic optical switch without stops.

Reference is next made to FIG. 4, wherein yet another embodiment of an electromagnetic optical switch, designated generally at 400, is shown. Many of the components that make up the electromagnetic optical switch are described in more detail with reference to FIG. 1. The embodiment of an electromagnetic optical switch 400 shown in FIG. 4 is similar to FIG. 1 except that switch 400 does not contain any stops for securing the reflection member 405 in a particular position. Instead, the magnetic forces generated by the base magnetic members 430, 435 are precisely controlled so as to properly align the reflection member 405 in the desired position. Similar to FIGS. 1-3, the reflection member 405 includes a mirror 407, a substrate 410 and two substrate magnetic members 415, 420. The substrate magnetic members 415, 420 are formed from of a pre-magnetized hard ferromagnetic substance. Also similar to FIG. 1, a pair of flexures 425, 427 are used to elastically couple the reflection member 405 to a base 470.

As is further shown in FIG. 4, the base 470 forms a hollow cavity 422 with a particular width and depth configured to house the reflection member 405 in the manner shown. A first and a second base magnetic member 430, 435 are located at the bottom of the cavity 422 such that they are each approximately horizontally aligned with one of the substrate magnetic members 415, 420 located on the bottom of the substrate 410. A first and a second electrical assembly 460, 465 are positioned to individually apply a magnetic field across the first and second base magnetic members 430, 435 respectively. The electrical assemblies 460, 465 include an electrical conductor 440, 445 and an electrical circuit 450, 455. Unlike FIG. 1, the electrical assemblies 450, 455 comprise an electrical source, a switch, a thermal compensation circuit, and an alignment circuit. In addition, the electrical circuits 450, 455 may be connected to external computer circuitry or contain logic circuits to efficiently control the timing and amount of electrical current placed across the electrical conductors 440, 445.

Since the embodiment shown in FIG. 4 does not contain any stops to help align the reflection member 405, it is necessary to utilize additional components in the electrical circuits 450, 455. The alignment circuit executes an alignment algorithm that utilizes optical feedback to determine the best angle for the reflection member 405. Upon completion, the algorithm stores the electrical signals necessary to generate the magnetic field upon the base magnetic members 430, 435 that will generate the necessary magnetic force upon the substrate magnetic members 415, 420 so as to position the reflection member 405 at the proper angle.

The thermal compensation circuit senses thermal disturbances that would potentially affect the angle of the reflection member. Upon sensing these disturbances, the thermal compensation circuit adjusts the electrical signals to correct for the disturbance. Additional circuits may be included in the electrical circuits 450, 455 so as to ensure proper alignment and calibration of the electromagnetic optical switch 400. Other than the additional electrical components and the lack of stops, the operation of electromagnetic optical switch 400 is similar to the embodiment described with reference to FIG. 1.

Figure 5:
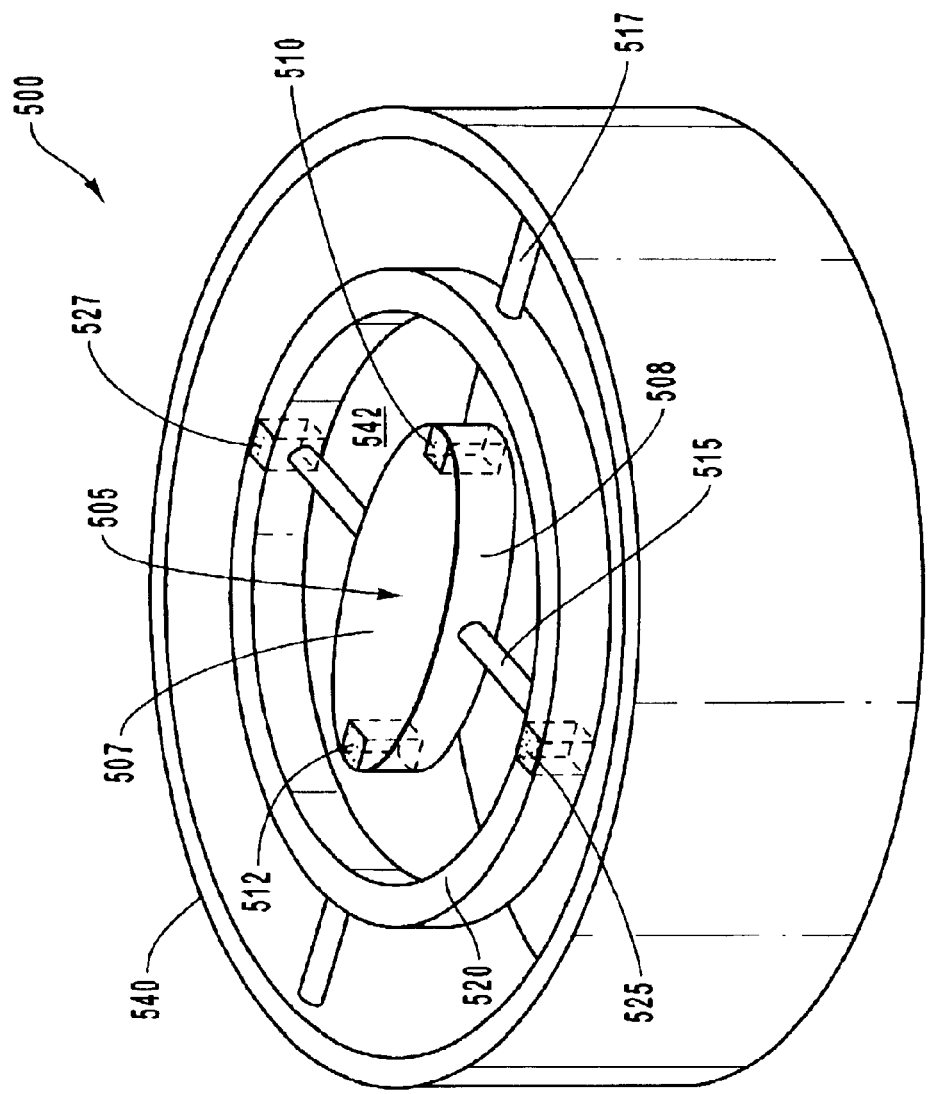
FIG. 5 illustrates a three-dimensional perspective view of a presently preferred embodiment of an electromagnetic optical switch.

Reference is next made to FIG. 5, wherein a presently preferred embodiment of an electromagnetic optical switch, designated generally at 500, is shown. Many of the components that make up the electromagnetic optical switch 500 are described in more detail with reference to FIG. 1. FIG. 5 shows a three-dimensional view of electromagnetic optical switch 500. The reflection member 505 is suspended by two sets of torsion bars 515, 517, such that the reflection member can be rotated into almost any three-dimensional position. The torsion bars 515, 517 can be rotated but not bent. The torsion bars 515, 517 behave like a spring, such that they spring back to a normalized position when a force is removed from them. Torsion bars 515, 517 represent another example of means for coupling the reflection member to the base in a manner that allows rotational motion of the reflection member and also represents another example of means for supporting the reflection member in any of a plurality of positions. In general, the flexures and torsion bars, as well as other structures that perform the equivalent function of coupling the reflection member to the base can be used according to the invention.

Similar to FIGS. 1-4, the reflection member 505 includes a mirror 507, a substrate 509, and two substrate magnetic members 510, 512. The two magnetic members 510, 512 are located along a plane that is perpendicular to the axis defined by the inner torsion bars 515. In this embodiment, an outside ring 520 allows for rotation with two degrees of freedom. The outside ring 520 is rotatably coupled to the reflection member 505 via the inner torsion bars 515. The outside ring 520 is rotatably coupled to the base 540 via the outside torsion bars 517. The inner torsion bars 515 have an axis of rotation that is perpendicular to the axis of rotation of the outer torsion bars 517. In addition, the outside ring 520 contains two ring magnetic members 525, 527 that are formed from pre-magnetized hard ferromagnetic substances. The magnetic members 525, 527 are located along a plane that is perpendicular to the axis of rotation of the outer torsion bars 517.

As is further shown in FIG. 5, the base 540 forms a cavity 542 that has a particular height and width to house the reflection member 505 and the outside ring 520 in the manner shown. At the bottom of the cavity are located four base magnetic members (not shown) that correspond to the two substrate magnetic members 510, 512 and the two ring magnetic members 525, 527. In addition, four electrical assemblies (not shown) are also located at the bottom of the cavity 542 and are positioned to individually apply a magnetic field upon one of the base magnetic members (not shown).

In operation, the electromagnetic optical switch 500 shown in this embodiment operates similarly to the embodiments described in reference to FIGS. 1-4. The four electrical assemblies (not shown) generate a magnetic field that causes the base magnetic members (not shown) to generate a magnetic force upon either the substrate magnetic members 510, 512 or the ring magnetic members 525, 527. This magnetic force can be used to position the reflection member 505 at selected angular positions defined by the rotation about the two axes of rotation almost any three dimensional angle. Similar to the embodiment shown in FIG. 4, this embodiment does not contain stops to help align the reflection member and prevent over-rotation. Because of this, additional electrical components, such as thermal compensation and calibration circuits can be used to precisely align the reflection member 505 as described above in reference to FIG. 4. The embodiment of FIG. 5 provides the benefit of switching between a large number of fibers, whereas the embodiments shown in FIGS. 1-4 are generally limited to fewer fibers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electromagnetic optical switch comprising:
    a reflection member capable of reflecting a light signal at an angle corresponding to an angular position of the reflection member;
    a magnetic member capable of exerting a magnetic force upon the reflection member;
    an electrical assembly configured to temporarily induce a magnetic field across the magnetic member such that the magnetic member exerts the magnetic force and causes the angular position of the reflection member to change such that the reflection member is capable of reflecting the light onto a selected one of a plurality of output structures, the electrical assembly including:
        an electrical source capable of generating current;
        an electrical conductor electrically coupled to the electrical source, wherein the electrical conductor generates a magnetic field when current is conducted therethrough;
        an electrical switch disposed between the electrical source and the electrical conductor;
        a thermal compensation circuit configured to adjust the angular position of the reflection member according to thermal interference; and
        a calibration circuit configured to determine an optimum position of the reflection member and corresponding current for each position of the electromagnetic optical switch.

2. The electromagnetic optical switch of claim 1, further comprising a base defining a cavity; wherein the reflection member and the magnetic members are housed within the cavity.

3. The electromagnetic optical switch of claim 2, wherein the magnetic member is disposed on the base within the cavity.

4. The electromagnetic optical switch of claim 1, wherein the magnetic member is formed from a hard ferromagnetic material.

5. The electromagnetic optical switch of claim 2, further comprising a plurality of coupling means for coupling the reflection member to the base in a manner that allows rotational motion of the reflection member.

6. The electromagnetic optical switch of claim 5 wherein the coupling means comprise flexures coupled to the base and the reflection member.

7. The electromagnetic optical switch of claim 5 wherein the coupling means comprise torsion bars coupled to the base and the reflection member.

8. The electromagnetic optical switch of claim 5, wherein the coupling means comprise first coupling means for allowing rotational motion of the reflection member about a first axis of rotation and second coupling means for allowing rotational motion of the reflection member about a second axis of rotation.

9. The electromagnetic optical switch of claim 1, further comprising:
    a substrate having an upper surface and a lower surface;
    a mirror positioned on the upper surface of the substrate; and
    a magnetic substrate member positioned at the lower surface of the substrate.

10. The electromagnetic optical switch of claim 9, wherein the magnetic substrate member is formed from a pre-magnetized hard ferromagnetic material.

11. The electromagnetic optical switch of claim 1, wherein the electrical switch is connected to external circuitry for externally coordinating the operation of the electrical assembly.

12. The electromagnetic optical switch of claim 1, wherein the electrical conductor is stacked and disposed in close proximity to the magnetic member such that the magnetic field is generated across the magnetic member when the current is passed through the electrical conductor.

13. The electromagnetic optical switch of claim 1, wherein the electrical conductor is wrapped around the magnetic member such that the magnetic field is generated across the magnetic member when the current is passed through the electrical conductor.

14. An electromagnetic optical switch comprising:

a reflection member capable of reflecting light signals at an angle corresponding to an angle of the reflection member;

means for electromagnetically moving the reflection member into a fixed position by temporarily inducing a current that initiates the movement of the reflection member; wherein the reflection member is capable of reflecting light signals to one of a plurality of output structures when located in the fixed position;

means for supporting the reflection member in a plurality of positions; and circuitry that provides feedback regarding operation of the electromagnetic optical switch.

15. The electromagnetic optical switch of claim 14, comprising a base defining a cavity, wherein the means for electro-magnetically positioning the reflection member and the means for supporting the reflection member in a plurality of positions are housed within the cavity.

16. The electromagnetic optical switch of claim 15, wherein the means for supporting the reflection member in a plurality of positions comprise flexures coupled to the base and the reflection member.

17. The electromagnetic optical switch of claim 15, wherein the means for supporting the reflection member comprise torsion bars coupled to the base and the reflection member.

18. The electromagnetic optical switch of claim 14, wherein the reflection member comprises:

a substrate having an upper surface and a lower surface;

a mirror positioned at the upper surface of the substrate; and a magnetic substrate member positioned at the lower surface of the substrate.

19. The electromagnetic optical switch of claim 18, wherein the magnetic substrate member is formed from a pre-magnetized hard ferromagnetic material.

20. A method of rotating a mirror within an electromagnetic optical switch for the purpose of redirecting optical signals, comprising the acts of:

temporarily inducing a current across a conductor configured to generate a magnetic field across a first piece of ferromagnetic material;

generating a magnetic force between the first piece of ferromagnetic material and a second piece of ferromagnetic material coupled to a mirror;

moving the mirror into a fixed position in response to the magnetic force, such that the mirror is positioned to reflect optical signals into one of a plurality of output structures; and terminating the current induction across the conductor when an output feedback value relating to the redirection of the optical signals is optimized.

21. The method of claim 20, wherein the conductor is a metallic wire wrapped around the first piece of ferromagnetic material.

22. The method of claim 20, wherein the plurality of output structures comprises optical waveguides.

23. A method of calibrating an electromagnetic optical switch to one of a plurality of output locations, comprising the acts of:

inducing a steadily increasing current across a conductor configured to generate a magnetic field, corresponding to the magnitude of the current, across a first piece of ferromagnetic material;

generating a magnetic force, corresponding to the magnitude of the magnetic field, between the first piece of ferromagnetic material and a second piece of ferromagnetic material coupled to a mirror;

moving the mirror in response to the magnetic force;

switching off the current and consequently the magnetic force, when an output feedback value from the desired output location is optimized; and storing the current value necessary to generate the optimum output feedback value.

24. The method for rotating a mirror within an electromagnetic optical switch of claim 23, wherein the conductor is a metallic wire wrapped around the first piece of ferromagnetic material.

25. The method for rotating a mirror within an electromagnetic optical switch of claim 23, wherein the output feedback value is a measurement of optical intensity of a light signal reflected by the mirror.

26. A method of thermally compensating the alignment of a mirror of an electromagnetic optical switch to one of a plurality of output locations, comprising the acts of:

sensing thermal interference that is to affect the alignment of the mirror of the electromagnetic optical switch;

determining if an output feedback value associated with the mirror indicates that the mirror is positioned at a desired location; and if the output feedback value indicates that the mirror is not positioned at the desired location, performing the acts of:

inducing an increasing current across a conductor configured to generate a magnetic field, corresponding to the magnitude of the current, across a first piece of ferromagnetic material;

generating a magnetic force, corresponding to the magnitude of the magnetic field, between the first piece of ferromagnetic material and a second piece of ferromagnetic material coupled to the mirror;

moving the mirror in response to the magnetic force;

switching off the current when the output feedback value associated with the mirror indicates that the mirror is positioned at the desired location; and storing the current value necessary to generate the output feedback value that indicates that the mirror is positioned at the desired location.

27. The method for rotating a mirror within an electromagnetic optical switch of claims 26, wherein the conductor is a metallic wire wrapped around the first piece of ferromagnetic material.

28. The method for rotating a mirror within an electromagnetic optical switch of claim 26, wherein the output feedback value is a measurement of the optical intensity of a light signal reflected by the mirror.

29. An electromagnetic optical switch, comprising:

a base at least partially defining a cavity;

a reflection member capable of reflecting a light signal, including:

a substrate;

a mirror deposited on a top surface of the substrate; and a first set of magnetic members positioned on a bottom surface of the substrate;

a plurality of flexures that movably attach the reflection member to the base such that the reflection member is positioned in the cavity;

at least one electrical assembly positioned in the base that provides a magnetic force with respect to the first set of magnetic members to selectively change the angular position of the reflection member; and a plurality of stop members positioned in the cavity to limit the angular rotation of the reflection member wherein each stop member is composed of a magnetic material, and wherein each stop member is positioned to interact with corresponding magnetic portions positioned on the reflection member.

30. The electromagnetic optical switch of claim 29, wherein the cavity is further defined by first and second assemblies that are positioned on the base, and wherein at least some of the stop members are positioned on the first and second assemblies.

31. The electromagnetic optical switch of claim 29, wherein the reflection member is movable about a single axis of rotation.

32. The electromagnetic optical switch of claim 29, wherein the at least one electrical assembly includes a second set of magnetic members that extend into the cavity.

* * * * *

UNITED STATES PATENT AND TRADEMARK OFFICE
CERTIFICATE OF CORRECTION

PATENT NO. : 6,798,942 B2 Page 1 of 1
APPLICATION NO. : 10/117769
DATED : September 28, 2004
INVENTOR(S) : William R. Freeman and Dallas Meyer It is certified that error appears in the above-identified patent and that said Letters Patent is hereby corrected as shown below:

Drawings
Figure 3, change flexture label "360" to -- 361 --.

Column 2,
Line 23, change "they possess" to -- it possesses--.

Column 6,
Line 48, change "mare" to -- more --.

Column 9,
Line 2, change "509" to -- 508 --.

Column 12,
Line 47, before "26" change "claims" to -- claim --.

Signed and Sealed this

Twenty-seventh Day of June, 2006

JON W. DUDAS
*Director of the United States Patent and Trademark Office*